(12) United States Patent
Jackson

(10) Patent No.: US 7,398,748 B1
(45) Date of Patent: *Jul. 15, 2008

(54) POPPET VALVE AND ENGINE USING SAME

(76) Inventor: Jason Stewart Jackson, 709 Cumberland Cir. NE., Atlanta, GA (US) 30306

( * ) Notice: Subject to any disclaimer, the term of this patent is extended or adjusted under 35 U.S.C. 154(b) by 0 days.

This patent is subject to a terminal disclaimer.

(21) Appl. No.: 11/941,923

(22) Filed: Nov. 16, 2007

Related U.S. Application Data

(63) Continuation of application No. 11/507,419, filed on Aug. 21, 2006, now Pat. No. 7,311,068.

(60) Provisional application No. 60/792,415, filed on Apr. 17, 2006.

(51) Int. Cl.
*F01L 1/28* (2006.01)
*F02N 3/00* (2006.01)

(52) U.S. Cl. .................................. 123/79 C; 123/188.2

(58) Field of Classification Search ............... 123/79 R, 123/79 C, 184.2, 184.3, 184.4
See application file for complete search history.

(56) References Cited

U.S. PATENT DOCUMENTS

| | | |
|---|---|---|
| 1,191,150 A | 7/1916 | Brown |
| 1,418,911 A | 6/1922 | Garlick |
| 2,439,618 A | 4/1948 | Cloutier |
| 2,988,080 A | 6/1961 | Rankl |
| 3,640,261 A | 2/1972 | Josey |
| 3,881,459 A | 5/1975 | Gaetcke |
| 3,903,855 A | 9/1975 | Klakular |
| 3,945,605 A | 3/1976 | Fleischer |
| 3,987,769 A | 10/1976 | Yew |
| 3,995,609 A | 12/1976 | Klomp |
| 4,015,577 A | 4/1977 | Elsbett |
| 4,062,330 A | 12/1977 | Billings |
| 4,075,986 A | 2/1978 | Keck |
| 4,134,381 A | 1/1979 | Little |
| 4,159,011 A | 6/1979 | Sperry |
| 4,184,814 A | 1/1980 | Parker |
| 4,187,059 A | 2/1980 | Parker |
| 4,207,854 A | 6/1980 | Alford |
| 4,256,062 A | 3/1981 | Schafer |
| 4,269,218 A | 5/1981 | Sudo |
| 4,309,969 A | 1/1982 | Matthes |
| 4,320,725 A | 3/1982 | Rychlik |
| 4,344,394 A | 8/1982 | Showalter |
| 4,359,022 A | 11/1982 | Nakamura |
| 4,362,134 A | 12/1982 | Worthen |
| 4,366,787 A | 1/1983 | Gale |
| 4,370,955 A | 2/1983 | Ruggeri |

(Continued)

*Primary Examiner*—Noah Kamen

(57) ABSTRACT

One embodiment of the present invention provides a poppet valve offering an increased valve area, comprising an outer valve head having an outer valve port and an inner valve head having an inner valve port. The inner valve head is rotatable relative to the outer valve head to align the inner and outer valve ports, thereby increasing the effective valve area of the poppet valve. The path created by aligning the inner and outer valve ports can be designed to mix air flowing through the poppet valve. Another embodiment of the present invention provides a valve guide containing a poppet valve having a guide pin, wherein the guide pin rests within a groove in the valve guide. As the poppet valve moves through the valve guide, the groove controls movement of the guide pin and causes the poppet valve to rotate relative to the valve guide.

50 Claims, 7 Drawing Sheets

U.S. PATENT DOCUMENTS

| | | |
|---|---|---|
| 4,398,511 A | 8/1983 | Nemazi |
| 4,424,777 A | 1/1984 | Klomp |
| 4,428,335 A | 1/1984 | Cataldo |
| 4,432,312 A | 2/1984 | Klomp |
| 4,494,572 A | 1/1985 | Loveless |
| 4,537,028 A | 8/1985 | Humke |
| 4,539,950 A | 9/1985 | Schaich |
| 4,559,909 A | 12/1985 | Honda |
| 4,572,117 A | 2/1986 | Yoshikawa |
| 4,593,918 A | 6/1986 | Geissler |
| 4,597,367 A | 7/1986 | Hayashi |
| 4,602,598 A | 7/1986 | Moore |
| 4,686,948 A | 8/1987 | Smith |
| 4,706,967 A | 11/1987 | Ochsner |
| 4,712,619 A | 12/1987 | Stepp |
| 4,790,272 A | 12/1988 | Woolenweber |
| 4,811,704 A | 3/1989 | Boehmer |
| 4,826,180 A | 5/1989 | Deuring |
| 4,827,883 A | 5/1989 | Khalighi |
| 4,834,036 A | 5/1989 | Nishiyama |
| 4,836,154 A | 6/1989 | Bergeron |
| 4,893,592 A | 1/1990 | Falero |
| 4,901,683 A | 2/1990 | Huff |
| 4,932,377 A | 6/1990 | Lyle |
| 4,938,181 A | 7/1990 | Holmer |
| 4,981,118 A | 1/1991 | Lefebvre |
| 4,993,379 A | 2/1991 | Viazzi |
| 4,995,359 A | 2/1991 | Yokoyama |
| 5,005,538 A | 4/1991 | Bergeron |
| 5,020,486 A | 6/1991 | Unger |
| 5,040,501 A | 8/1991 | Lemelson |
| 5,041,168 A | 8/1991 | Purnell |
| 5,056,219 A | 10/1991 | Iwase |
| 5,062,908 A | 11/1991 | Purnell |
| 5,065,712 A | 11/1991 | Hundleby |
| 5,081,965 A | 1/1992 | Walters |
| 5,085,179 A | 2/1992 | Faulkner |
| 5,105,784 A | 4/1992 | Davis |
| 5,110,142 A | 5/1992 | Szott |
| 5,168,843 A | 12/1992 | Franks |
| 5,174,256 A | 12/1992 | Binford |
| 5,190,002 A | 3/1993 | Wietig |
| 5,237,971 A | 8/1993 | Worsley |
| 5,255,649 A | 10/1993 | Isaka |
| 5,267,543 A | 12/1993 | Novak |
| 5,301,640 A | 4/1994 | Barranco |
| 5,357,914 A | 10/1994 | Huff |
| 5,358,212 A | 10/1994 | Soltys |
| 5,454,357 A | 10/1995 | Elder |
| 5,460,139 A | 10/1995 | Marlin |
| 5,465,691 A | 11/1995 | Capaldo |
| 5,485,815 A | 1/1996 | Shida |
| 5,503,123 A | 4/1996 | Carter |
| 5,558,056 A | 9/1996 | Sakata |
| 5,592,913 A | 1/1997 | Matthews |
| 5,655,493 A | 8/1997 | Enright |
| 5,671,704 A | 9/1997 | Peng |
| 5,671,709 A | 9/1997 | Sokoloski |
| 5,673,656 A | 10/1997 | Knob |
| 5,690,067 A | 11/1997 | Reckzugel |
| 5,738,060 A | 4/1998 | Colo |
| 5,749,350 A | 5/1998 | Bender |
| 5,775,284 A | 7/1998 | Kirchner |
| 5,782,215 A | 7/1998 | Engelmann |
| 5,799,683 A | 9/1998 | Hamada |
| 5,803,042 A | 9/1998 | Bortone |
| 5,823,158 A | 10/1998 | Heimann |
| 5,873,337 A | 2/1999 | Binford |
| 5,875,747 A | 3/1999 | Lamp |
| 5,904,125 A | 5/1999 | Enright |
| 5,931,134 A | 8/1999 | Kudryashov |
| 6,006,713 A | 12/1999 | Gebauer |
| 6,024,060 A | 2/2000 | Buehrle |
| 6,119,960 A | 9/2000 | Graves |
| 6,125,810 A | 10/2000 | Haselkorn |
| 6,135,080 A | 10/2000 | Kallina |
| 6,173,684 B1 | 1/2001 | Buehrle |
| 6,202,616 B1 | 3/2001 | Gracyalny |
| 6,209,504 B1 | 4/2001 | Hegemier |
| 6,223,949 B1 | 5/2001 | Spencer |
| 6,234,142 B1 | 5/2001 | Sabo |
| 6,237,549 B1 | 5/2001 | Huff |
| 6,244,235 B1 | 6/2001 | Hegemier |
| 6,263,849 B1 | 7/2001 | Bonesteel |
| 6,314,932 B1 | 11/2001 | Kallina |
| 6,340,009 B1 | 1/2002 | Boecking |
| 6,374,793 B1 | 4/2002 | Narita |
| 6,443,121 B1 | 9/2002 | Carroll |
| 6,450,143 B1 | 9/2002 | Hegemier |
| 6,516,765 B1 | 2/2003 | Becker |
| 6,546,902 B1 | 4/2003 | Davis |
| 6,679,219 B1 | 1/2004 | Pacinelli |
| 6,718,932 B1 | 4/2004 | Cecur |
| 6,739,570 B2 | 5/2004 | Carlsen |
| 6,848,408 B1 | 2/2005 | Mendler |
| 6,901,902 B1 | 6/2005 | Butcher |
| 6,907,851 B2 | 6/2005 | Barnes |
| 7,069,884 B2 | 7/2006 | Baba |
| 7,086,367 B2 | 8/2006 | Procknow |
| 2003/0010314 A1 | 1/2003 | Brosseau |
| 2003/0015240 A1 | 1/2003 | Nelson |
| 2003/0089869 A1 | 5/2003 | Hall |
| 2003/0136389 A1 | 7/2003 | Brosseau |
| 2003/0213443 A1 | 11/2003 | Cornell |
| 2004/0021122 A1 | 2/2004 | McArthy |
| 2004/0099231 A1 | 5/2004 | Methley |
| 2004/0107936 A1 | 6/2004 | Leimer |
| 2004/0182362 A1 | 9/2004 | Tsukui |
| 2004/0221824 A1 | 11/2004 | Denteler |
| 2004/0226536 A1 | 11/2004 | Sakai |
| 2005/0092952 A1 | 5/2005 | McCarroll |
| 2005/0098138 A1 | 5/2005 | Sanders |
| 2005/0274367 A1 | 12/2005 | Malone |
| 2006/0037577 A1 | 2/2006 | Procknow |
| 2006/0065227 A1 | 3/2006 | Hegemier |
| 2006/0086329 A1 | 4/2006 | Cornell |
| 2006/0137650 A1 | 6/2006 | Nakamura |
| 2006/0278286 A1 | 12/2006 | Spakowski |
| 2007/0039584 A1 | 2/2007 | Ellingsen |

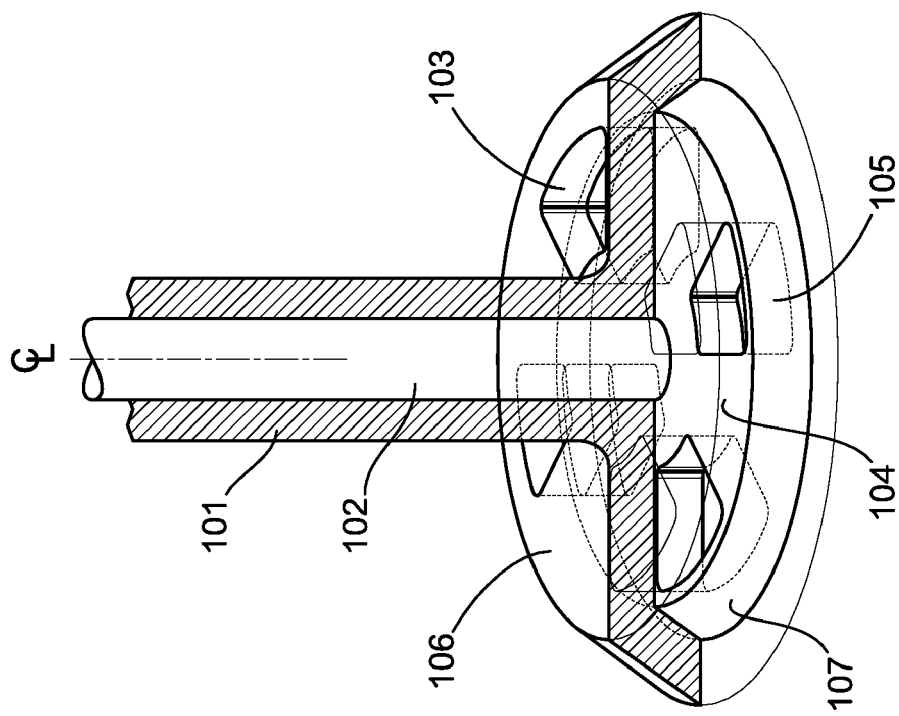
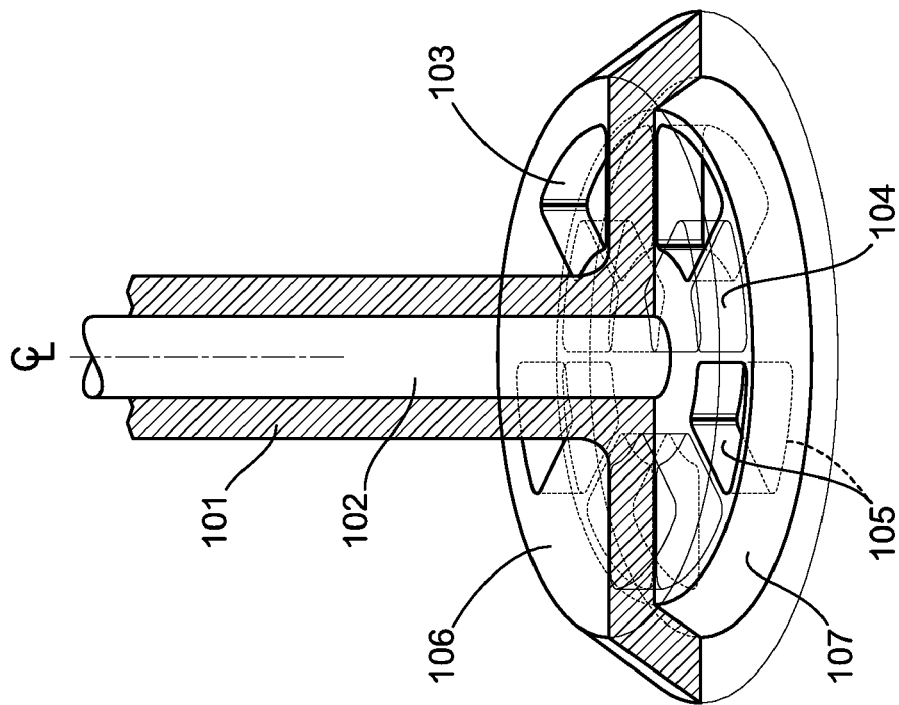

POPPET VALVE AND ENGINE USING SAME

CROSS-REFERENCE TO RELATED APPLICATIONS

This application is a continuation of U.S. application Ser. No. 11/507,419, now U.S. Pat. No. 7,311,068, filed Aug. 21, 2006, which claims priority to U.S. Provisional Application Ser. No. 60/792,415 entitled "Poppet Valve and Engine Using Same", filed on Apr. 17, 2006, which are each herein incorporated by reference in their entirety.

BACKGROUND OF THE INVENTION

The operation of internal combustion engines is well known to those of skill in the art. For example, a typical one-cylinder, two-valve internal combustion engine includes a reciprocating piston which defines a combustion chamber for the combustion of a fuel charge comprising a fuel-air mixture, with the combustion chamber being the variable volume between the top of the piston and the cylinder head. The cylinder head contains an intake poppet valve ("intake valve"), an exhaust poppet valve ("exhaust valve"), and an ignition source such as a spark plug. The piston is connected via a connecting rod to a crankshaft which converts the reciprocating linear motion of the piston into a useful torque on the crankshaft.

During the intake stroke, the piston moves downward and away from the cylinder head, lowering the pressure in the combustion chamber relative to the pressure on the other side of the intake valve. As the piston travels downward, the intake valve extends into the combustion chamber, or "lifts," wherein the pressure differential between the combustion chamber and the intake port causes the fuel charge to flow into the combustion chamber. The intake valve then closes and the fuel mixture is compressed in the combustion chamber as the piston travels toward the cylinder head. At top dead center, the piston is at its maximum vertical position and the fuel charge is at its maximum compression. The fuel mixture is then ignited, driving the piston downwards and generating a torque on the crank shaft. The exhaust valve then opens and the positive pressure of the exhaust gas causes it to flow out of the combustion chamber and into the exhaust port.

As understood by one of skill in the art, the amount of fuel charge that can flow into the combustion chamber during the limited time that the intake valve is open is a function of the "intake valve area," which consists of the two-dimensional area between the intake valve at maximum lift and the cylinder head. Since an internal combustion engine is essentially an air pump, the power and efficiency of an internal combustion engine is directly proportional to the intake valve area. Similarly, the power and efficiency of an internal combustion engine is also proportional to the amount of exhaust gas that can be expelled from the combustion chamber during the limited time that the exhaust valve is open. The amount of exhaust gas expelled is a function of the exhaust valve area. Similarly, the power and efficiency of an internal combustion engine is also a function of how well the fuel and air have been mixed just prior to combustion.

Poppet valves as known in the art generally comprise a narrow valve stem which rapidly widens at one end into a circular valve head. The valve head fits into a corresponding circular opening in the cylinder head such that the combustion chamber is a closed volume when the intake and exhaust valves are closed. Modern internal combustion engines sometimes use more than two total valves to increase the total intake and exhaust valve areas, providing greater engine efficiency and power output. For example, some internal combustion engines use two intake valves and two exhaust valves, which provide a larger total valve area than a two-valve design. Some engines even use three intake valves and two exhaust valves to further increase total valve area. However, there is a limit to the number of valves that can be used in a given cylinder head because the area of the cylinder head in which the valves rest is finite. Additionally, using a very large number of small valves does not improve engine efficiency because a very small valve area has a greater flow resistance per unit area than a larger valve area.

Internal combustion engines use fuels that are derived from crude oil, the supply of which is increasingly finite and unstable. When combustion engines burn such fuels they produce emissions that cause a negative impact on the environment—and governments have promulgated and enforced increasingly stringent environmental regulations as a result. But alternatives to the internal combustion engine are few, and they are costly. In light of these and other developments, there is an increasing need in the art to extract more power and efficiency from combustion engines.

A poppet valve that offered an increased valve area would produce more power per unit of fuel than existing poppet valves, thus enabling manufacturers to produce engines that consume less fuel without sacrificing power. The same results would inhere from the use of a poppet valve that caused the fuel charge to mix more thoroughly in the combustion chamber, such as by creating a vortex in the combustion chamber. Moreover, a poppet valve combining these elements would increase fuel efficiency more than would a poppet valve offering either element standing alone. A combustion engine using poppet valves that offered an increased valve area or caused the fuel charge to mix more thoroughly, or both, would, by increasing fuel efficiency, enable users of combustion systems to reduce their energy consumption. This, in turn, would materially contribute to the more efficient utilization and conservation of energy resources. The reduction in energy consumption also would lead to a reduction in harmful emissions, thus materially enhancing the quality of the environment.

SUMMARY OF THE INVENTION

In one embodiment of the present invention, a poppet valve is provided. The poppet valve comprises an outer valve head comprising an outer valve port and an inner valve head comprising an inner valve port. An inner valve port can be a closed two-dimensional area, or the inner valve port can be an open two-dimensional area. Similarly, the outer valve port can be a closed two-dimensional area, or the outer valve port can be an open two-dimensional area. The inner valve head is rotatable relative to the outer valve head so that the outer valve port can be aligned with the inner valve port, thereby increasing the effective valve area of the poppet valve.

In another embodiment of the present invention, a poppet valve is provided. The poppet valve comprises an outer valve head comprising an outer valve port and an inner valve head comprising a valve "port cover." The port cover is a solid portion of the inner valve head which can obstruct flow through the outer valve port. The inner valve head is rotatable relative to the outer valve head so that the port cover can open a path through the outer valve port, thereby increasing the effective valve area of the poppet valve.

In a further embodiment of the present invention, a poppet valve is provided. The poppet valve comprises a hollow outer valve containing an inner valve. The outer valve comprises an outer valve stem and an outer valve head, with the outer valve head having one or more outer valve ports. The inner valve comprises an inner valve stem and an inner valve head, with the inner valve head having one or more valve port covers corresponding to the one or more outer valve ports. The inner valve rotates relative to the outer valve, causing the valve port covers to open and close the outer valve ports, thereby increasing the effective valve area of the poppet valve.

Another embodiment of the present invention provides a poppet valve comprising a hollow outer valve containing an inner valve. The outer valve comprises an outer valve stem and an outer valve head, with the outer valve head having one or more outer valve ports. The inner valve comprises an inner valve stem and an inner valve head, with the inner valve head having one or more inner valve ports corresponding to the one or more outer valve ports. The inner valve rotates relative to the outer valve, causing the outer valve ports and the inner valve ports to align, thereby increasing the effective valve area of the poppet valve. Further, the outer valve ports and the inner valve ports can be arranged to improve mixing of the fuel charge in the combustion chamber. For example, in one embodiment, the outer valve ports and inner valve ports are arranged to create a spiral or vortex in the combustion chamber.

In yet another embodiment of the present invention, a guide pin is located on the outer valve stem of a poppet valve, with the guide pin being used to rotate the outer valve relative to the inner valve. In a further embodiment, the poppet valve may be located within a valve guide, wherein the valve guide includes a recessed timing groove in contact with the guide pin. The timing groove controls the movement of the guide pin as the poppet valve moves longitudinally through the valve guide, enabling the outer valve to rotate relative to the valve guide to selectively open and close the valve ports. As understood by one of skill in the art, any means may be used to prevent or control rotation of the inner valve relative to the outer valve, including mechanical, hydraulic, or electronic actuation. In further embodiments, two or more guide pins or timing grooves may be used.

In another embodiment of the present invention which includes a poppet valve, a guide pin is located on an inner valve stem and a timing window is located on an outer valve stem. The guide pin rests within the timing window, with the timing window defining the maximum degree of rotation of the inner valve relative to the outer valve. Further, the poppet valve may be located within a valve guide, wherein the valve guide includes a recessed timing groove in contact with the guide pin. The timing groove controls the movement of the guide pin as the poppet valve moves longitudinally through the valve guide, enabling the inner valve to rotate relative to the valve guide and selectively open and close the outer valve ports. In further embodiments, two or more guide pins, timing windows, or timing grooves may be used.

In a further embodiment of the present invention, a poppet valve is located within a valve guide, wherein the valve guide includes a longitudinal recessed groove and the outer valve includes a corresponding longitudinal ridge in contact with the groove, preventing the outer valve from freely rotating relative to the valve guide. The longitudinal ridge is additionally advantageous because it strengthens the outer valve stem.

Another embodiment of the present invention comprises an internal combustion engine having a combustion chamber and a poppet valve which allows air to flow from an intake passage into the combustion chamber. The poppet valve comprises an outer valve head having one or more outer valve ports, and an inner valve head having one or more inner valve ports. The inner valve rotates relative to the outer valve, aligning the inner and outer valve ports to create a plurality of paths through the poppet valve, thereby increasing the effective valve area of the poppet valve. In one embodiment, at least one path is designed to improve mixing of the fuel charge in the combustion chamber as air flows through the poppet valve. For example, one or both of the outer valve ports or the inner valve ports can be arranged to create a vortex or cyclone in the combustion chamber as air flows through the poppet valve.

In yet another embodiment of the present invention, a valve guide with a timing groove is provided. A poppet valve is located within the valve guide, with the poppet valve comprising a hollow outer valve containing an inner valve. The outer valve comprises an outer valve stem and an outer valve head, with the outer valve head having one or more outer valve ports. The inner valve comprises an inner valve stem and an inner valve head, with the inner valve head having one or more valve port covers corresponding to the one or more outer valve ports. The inner valve stem includes a guide pin which protrudes through a timing window in the outer valve stem, with the guide pin in contact with the timing groove. As the poppet valve moves longitudinally relative to the valve guide, the force exerted by the timing groove on the guide pin causes the inner valve to rotate relative to the valve guide, selectively opening and closing the outer valve ports. In one embodiment, the outer valve ports and/or port covers can be arranged to improve mixing of the fuel charge in the combustion chamber as air flows through the poppet valve. In another embodiment, the outer valve ports and/or port covers are arranged to create a vortex or swirling action in the combustion chamber as the fuel charge flows through the poppet valve.

In a further embodiment of the present invention, a method for operating an intake poppet valve in an internal combustion engine is provided, wherein the poppet valve comprises an inner valve head having an inner valve port and an outer valve head having an outer valve port. First, the piston moves away from the cylinder head, increasing the volume of the combustion chamber. Second, the poppet valve extends into the combustion chamber, enabling air to flow past the outer valve head into the combustion chamber. Third, the inner valve rotates in a first rotational direction relative to the outer valve, causing the outer valve port to open, enabling the fuel charge to flow into the combustion chamber through the outer valve port. Fourth, the poppet valve is retracted toward the cylinder head. Fifth, the inner valve is rotated relative to the outer valve in a direction opposite of the first rotational direction, causing the outer valve port to close. Sixth, the piston moves toward the cylinder head, decreasing the volume in the combustion chamber. Seventh, the outer head of the poppet valve rests against the cylinder head, closing the combustion chamber. Finally, the fuel charge in the combustion chamber is ignited. In further embodiments, one or more of the outer valve ports, inner valve ports, or valve port covers is or are arranged to improve mixing of the fuel charge in the combustion chamber as air flows through the poppet valve. For example, one or more of the outer valve ports and port covers can be arranged to create a vortex or swirling action in the combustion chamber as air flows through the poppet valve. Further, any embodiment of the poppet valve or valve guide of the present invention may be used with the present embodiment. One of skill in the art will also understand that the method of the current embodiment can be modified to operate an exhaust poppet valve in an internal combustion engine.

One of skill in the art will understand that any feature, element, or characteristic of any embodiment of the present invention can be used or combined with any feature, element, or characteristic of any other embodiment of the present invention. Unless otherwise expressly stated, it is in no way intended that any method or embodiment set forth herein be construed as requiring that its steps be performed in a specific order. Accordingly, where a method or system claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The accompanying drawings, which are incorporated in and constitute part of this specification, illustrate embodiments of the invention, and together with the description, serve to explain the principles of the invention. The embodiments described in the drawings and specification in no way limit or define the scope of the present invention.

FIG. 1A is a perspective view in partial section of one embodiment of the poppet valve of the present invention, showing the poppet valve in the closed position.

FIG. 1B is a perspective view in partial section of one embodiment of the poppet valve of the present invention, showing the poppet valve in the open position.

DETAILED DESCRIPTION OF THE INVENTION

Figure 2:
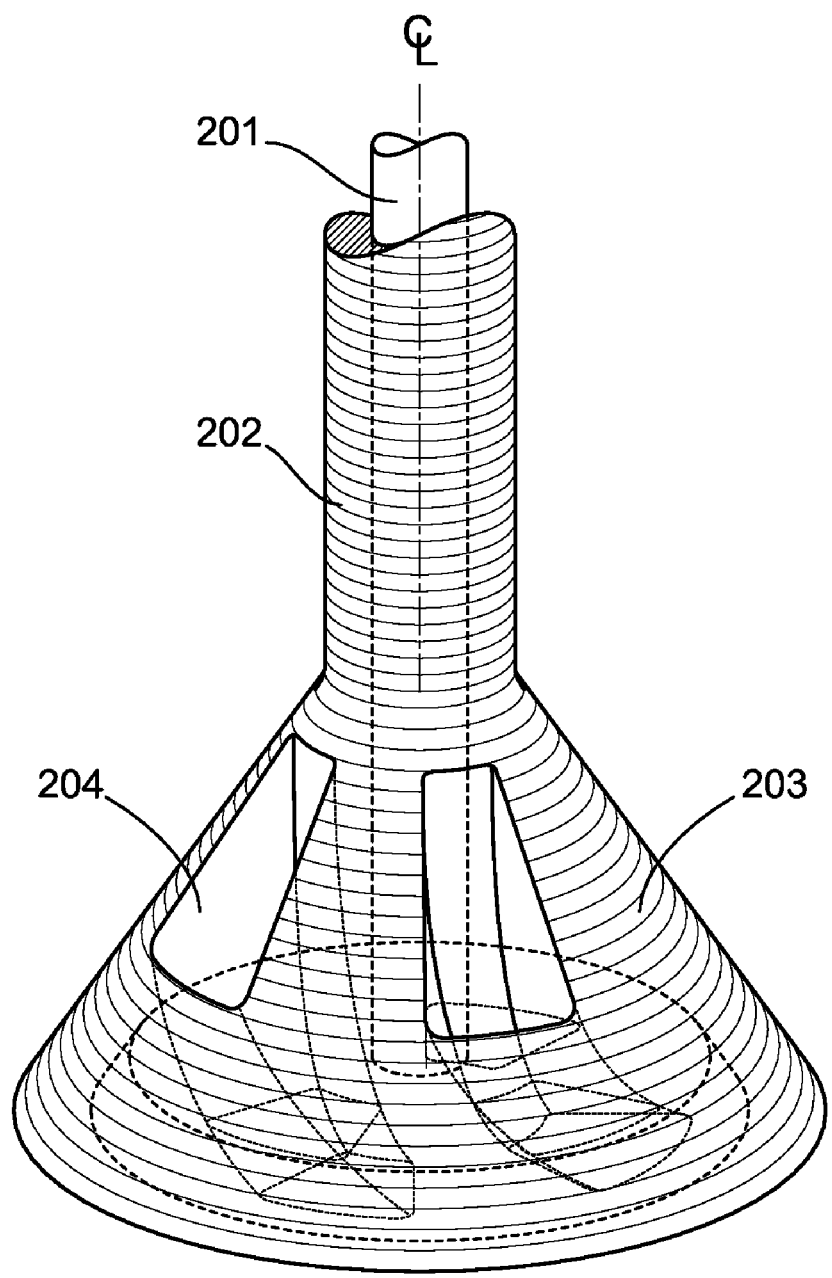
FIG. 2 is a perspective view of one embodiment of the poppet valve of the present invention showing a plurality of valve ports arranged to create a swirling action in the combustion chamber as air flows through the poppet valve.

The present invention has been illustrated in relation to embodiments which are intended in all respects to be illustrative rather than restrictive. Those skilled in the art will realize that the present invention is capable of many modifications and variations without departing from the scope of the invention.

The word "rotation" and the phrase "relative rotation" between any two components of the present invention refer to a relative rotation between the two components. As understood by one of skill in the art, "relative rotation" between a first component and a second component means that the first component may stay rotationally fixed while the second component rotates, that the first component rotates while the second component stays rotationally fixed, or that both the first and second components rotate simultaneously or at different times with respect to each other. Thus, in embodiments of the present invention which recite an inner valve rotating relative to, or with respect to, an outer valve, for example, the outer valve may be rotationally fixed while the inner valve rotates, the outer valve may rotate while the inner valve stays rotationally fixed, or both the inner and outer valves may rotate simultaneously with respect to each other. The words "align", "aligned", "alignment", and "aligning" are defined herein to refer to a partial or full alignment between two components. Thus, an inner valve port is aligned with an outer valve port if there is any path through those inner and outer valve ports through which a substance, such as air, can flow, regardless of the shape or size of the path.

One embodiment of the present invention provides a poppet valve as shown in FIG. 1A. The poppet valve in FIG. 1A comprises a hollow outer valve containing an inner valve. The outer valve comprises an outer valve stem 101 and an outer valve head 106, with the outer valve head 106 having four outer valve ports 103. The inner valve comprises an inner valve stem 102 and an inner valve head 107, with the inner valve head 107 having four valve port covers 104 corresponding to the four outer valve ports 103. The inner valve head 107 also comprises four inner valve ports 105 corresponding to the four outer valve ports 103. In the embodiment of FIG. 1A, one of skill in the art will see that the inner valve ports 105 comprise a closed two-dimensional area. The inner valve rotates relative to the outer valve, causing the valve port covers 104 to selectively open and close the outer valve ports 103, thereby increasing the effective valve area of the poppet valve. In the embodiment of FIG. 1A the poppet valve is in the closed position, wherein the outer valve ports 103 are obstructed by the port covers 104, preventing air from flowing through the outer valve ports 103.

FIG. 1B illustrates the poppet valve embodiment of FIG. 1A with the poppet valve in the open position. In this embodiment, the inner valve has been rotated relative to the outer valve, wherein the outer valve ports 103 are not obstructed by the valve port covers 104, and the outer valve ports 103 are aligned with the inner valve ports 105, allowing air to flow through the poppet valve by flowing through the outer valve ports 103 and then flowing through the inner valve ports 105. One of skill in the art will understand that embodiments of the present invention relating to a poppet valve can be used for any purpose and with regard to any type of substance, including solids, liquids, and gases. Accordingly, while some embodiments of the present invention describe a poppet valve useable with an internal combustion engine, these embodiments are descriptive and not limiting.

Another embodiment of the present invention provides a poppet valve comprising a hollow outer valve containing an inner valve, as shown in FIG. 2. The outer valve comprises an outer valve stem 202 and an outer valve head 203, with the outer valve head having one or more outer valve ports 204. The inner valve as seen in the figure comprises an inner valve stem and an inner valve head, with the inner valve head having one or more valve port covers and one or more inner valve ports corresponding to the outer valve ports 204. In the embodiment of FIG. 2, the inner valve rotates relative to the outer valve, causing the valve port covers to selectively open and close the outer valve ports 204, thereby increasing the effective valve area of the poppet valve. In this embodiment, the one or more outer valve ports 204 and inner valve ports are arranged to improve mixing of the fuel charge in the combustion chamber as air flows through the poppet valve. As shown in the embodiment of FIG. 2, the outer valve ports and the inner valve ports are arranged to create a swirl or vortex in the combustion chamber as air flows through the poppet valve. The swirling action produced by the poppet valve shown in the embodiment of FIG. 2 improves mixing of the fuel and air in the combustion chamber, enabling more power to be extracted from a given amount of fuel.

The embodiment of FIG. 2 can be extended by arranging the outer valve ports 204 and inner valve ports in a variety of ways to produce different mixing effects in the combustion chamber of an internal combustion engine. For example, in one embodiment, one or more of the outer valve ports 204 and/or inner valve ports may not be parallel to the outer valve stem 202. In another embodiment, the outer valve ports 204 and/or the inner valve ports are each directed towards one part of the combustion chamber, such as towards the center line of the combustion chamber. In yet another embodiment, the outer valve ports 204 and/or the inner valve ports are arranged such that the incoming air is directed away from the center line of the outer valve stem 202. In further embodiments, the outer valve ports 204 and/or the inner valve ports are directed to work in concert with other elements of the internal combustion engine to improve mixing of the fuel charge in the combustion chamber. For example, the outer valve ports 204 and/or the inner valve ports can be arranged to direct the fuel charge into grooves or channels in the top of the piston. One skilled in the art will appreciate that numerous outer valve port 204 and inner valve port arrangements are available to optimize the fuel charge mixing of a given internal combustion engine.

Figure 3B:
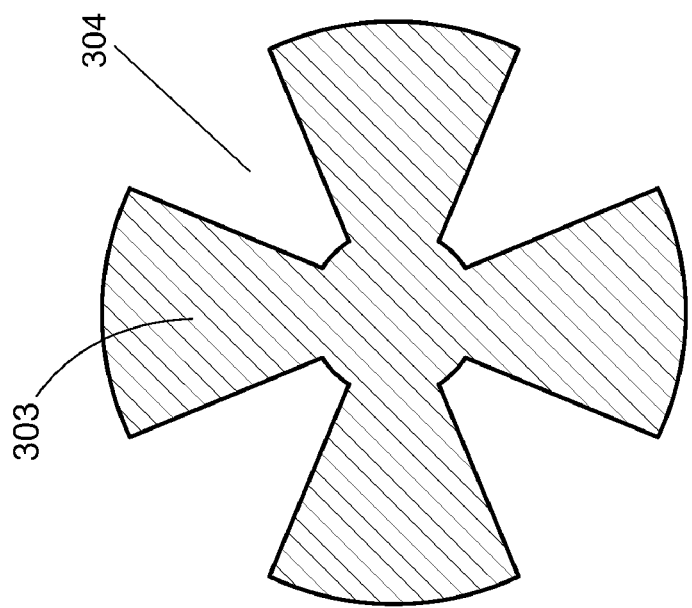
FIG. 3B is a perspective view of the inner valve head of another embodiment of the poppet valve of the present invention.
Figure 3A:
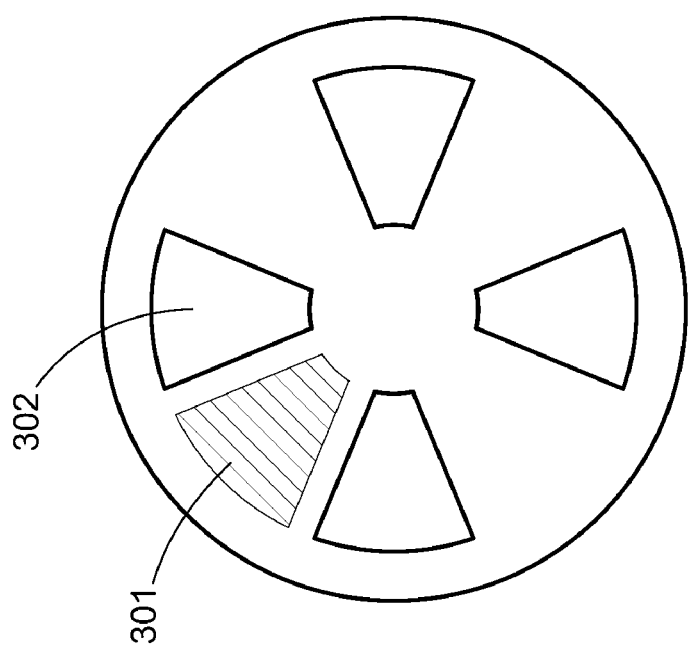
FIG. 3A is a perspective view of the inner valve head of one embodiment of the poppet valve of the present invention.

FIG. 3A shows a perspective view of one embodiment of an inner valve head usable with any embodiment of the poppet valve of the present invention, including the poppet valves embodied in FIGS. 1A, 1B, 2, 4A, 4B, 5, and 6. In FIG. 3A, the inner valve head is a circular disc comprising four valve port covers for obstructing flow. For illustrative and discussion purposes only, the inner valve head of FIG. 3A can be combined with the outer valve of FIG. 1A to create an embodiment of the present invention. One of skill in the art can see that the valve port cover 301 is a solid portion of the inner valve head which prevents the fuel charge from flowing through the outer valve ports 103 when the poppet valve is in the closed position. When the poppet valve is in the open position, the four outer valve ports 103 are aligned with the four inner valve ports 302, enabling air to flow through the poppet valve by flowing through the outer valve ports 103 and then by flowing through the inner valve ports 302. One of skill in the art can see that the inner valve ports 302 are closed two-dimensional areas in the current embodiment.

FIG. 3B shows a perspective view of another embodiment of an inner valve head usable with any embodiment of the poppet valve of the present invention, including the poppet valves embodied in FIGS. 1A, 1B, 2, 4A, 4B, 5, and 6. In FIG. 3B, the inner valve head comprises four valve port covers 303 as well as four inner valve ports 304. One of skill in the art will see that the inner valve ports 304 are open two-dimensional areas. For illustrative and discussion purposes only, the inner valve head of FIG. 3B can be combined with the outer valve of FIG. 1A to create an embodiment of the present invention. One of skill in the art can see that the valve port cover 303 is a solid portion of the inner valve head which prevents air from flowing through the outer valve ports 103 when the poppet valve is in the closed position. When the poppet valve is in the open position, the four outer valve ports 103 are not totally obstructed by the four valve port covers 303, enabling the fuel charge to flow through the poppet valve by flowing through the outer valve ports 103 and through the inner valve ports 304. One of skill in the art will see that the inner valve head shown in the embodiment of FIG. 3B does not have inner valve ports as in the embodiment of FIG. 3A because the area between adjacent valve port covers 303 in FIG. 3B is not closed by a connector around the circumference of the inner valve head as in FIG. 3A. Accordingly, the inner valve head depicted in FIG. 3B may have less mass than the inner valve head depicted in FIG. 3A because the valve port covers 303 are not connected as they are in FIG. 3A. Thus, the inner valve head of FIG. 3B may have less rotational inertia than the inner valve head of FIG. 3A.

Figure 4A:
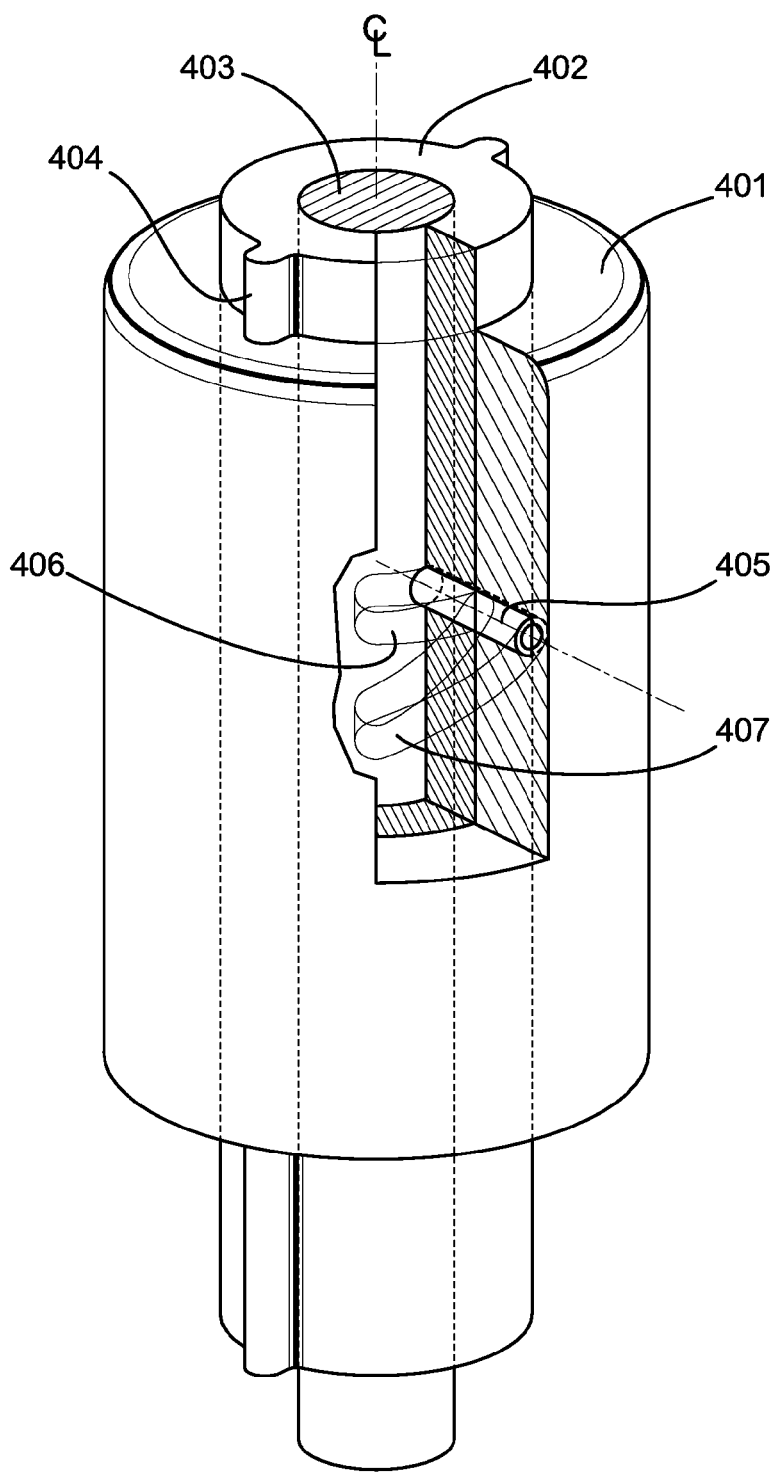
FIG. 4A is a perspective view in partial section of one embodiment of the valve guide of the present invention showing the guide pin in the valve closed position.

Another embodiment of the present invention, as disclosed in FIG. 4A, provides a valve guide for causing the inner valve of poppet valve embodiments of the present invention to rotate relative to the outer valve of poppet valve embodiments of the present invention. The embodiment of FIG. 4A is usable with any embodiment of the poppet valve of the present invention, including the embodiments shown in FIGS. 1A, 1B, 2, 3A, 3B, 5, and 6. For illustrative and discussion purposes only, the poppet valve embodiment of FIG. 1A can be combined with the valve guide embodiment of FIG. 4A to create a further embodiment of the present invention. In this embodiment, a guide pin 405 is located on the inner valve stem 403 and a timing window 406 is located on the outer valve stem 402. The guide pin 405 rests within the timing window 406 and the timing window 406 defines the full range of rotation of the inner valve relative to the outer valve. The "valve closed" and "valve open" positions are located within the range of rotation defined by the timing window 406.

As seen in the present embodiment, the valve guide 401 includes a recessed timing groove 407 in contact with the guide pin 405. The timing groove 407 controls the movement of the guide pin 405 as the poppet valve moves longitudinally through the valve guide 401. Thus, the timing groove 406 guides the guide pin 405 and causes the inner valve to rotate relative to the valve guide 401. One of skill in the art will understand that various means can be used to control the rotation of the outer valve relative to the inner valve in a way usable with the embodiment of FIG. 4A, including mechanical, hydraulic, or electronic means.

One embodiment for controlling rotation of the outer valve is shown in FIG. 4A. In FIG. 4A, the outer valve stem 402 includes a longitudinal ridge 404 which is located in a corresponding longitudinal groove of the valve guide 401. The longitudinal ridge 404 prevents the outer valve from rotating relative to the valve guide 401. Since the outer valve and the valve guide 401 do not rotate relative to each other, the guide pin 405 and timing groove 407 cause the inner valve to rotate relative to the outer valve, thereby selectively opening and closing the outer valve ports 103 of the poppet valve. Here, as seen in the current embodiment, the guide pin 405 is in the upper part of the timing groove 407, causing the poppet valve to be in the closed position wherein the valve port covers 104 obstruct the valve ports 103. Further, the longitudinal ridge 404 is additionally advantageous because it strengthens the outer valve stem 402. As one of skill in the art will understand, two or more guide pins, timing windows, or timing grooves may be used with embodiments of the present invention.

Figure 4B:
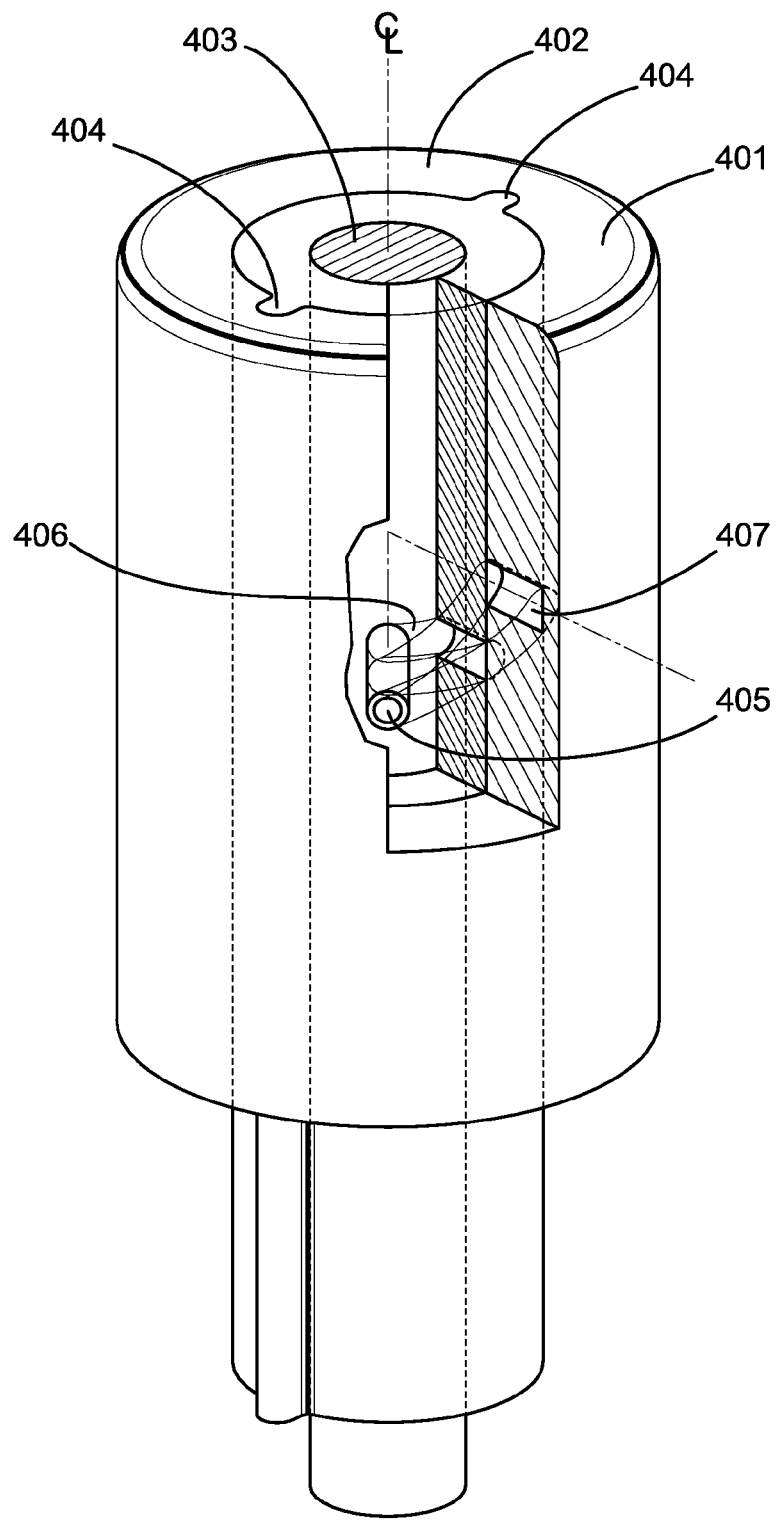
FIG. 4B is a perspective view in partial section of one embodiment of the valve guide of the present invention showing the guide pin in the valve open position.

FIG. 4B depicts the embodiments of FIG. 4A wherein the poppet valve has moved longitudinally downward through the valve guide 401. Since the poppet valve has traveled downward through the valve guide, the guide pin 405 has moved within the timing groove 407, causing the inner valve to rotate relative to the outer valve in a clockwise direction. Thus, the poppet valve is in the open position, wherein the outer valve ports 103 and the inner valve ports 105 are aligned, allowing air to flow through the poppet valve by flowing through the outer valve ports 103 and then by flowing through the inner valve ports 105. One of skill in the art will also see that the inner valve head of the embodiment of FIG. 3A or 3B can be used with the embodiments of FIGS. 4A and 4B.

Figure 5:
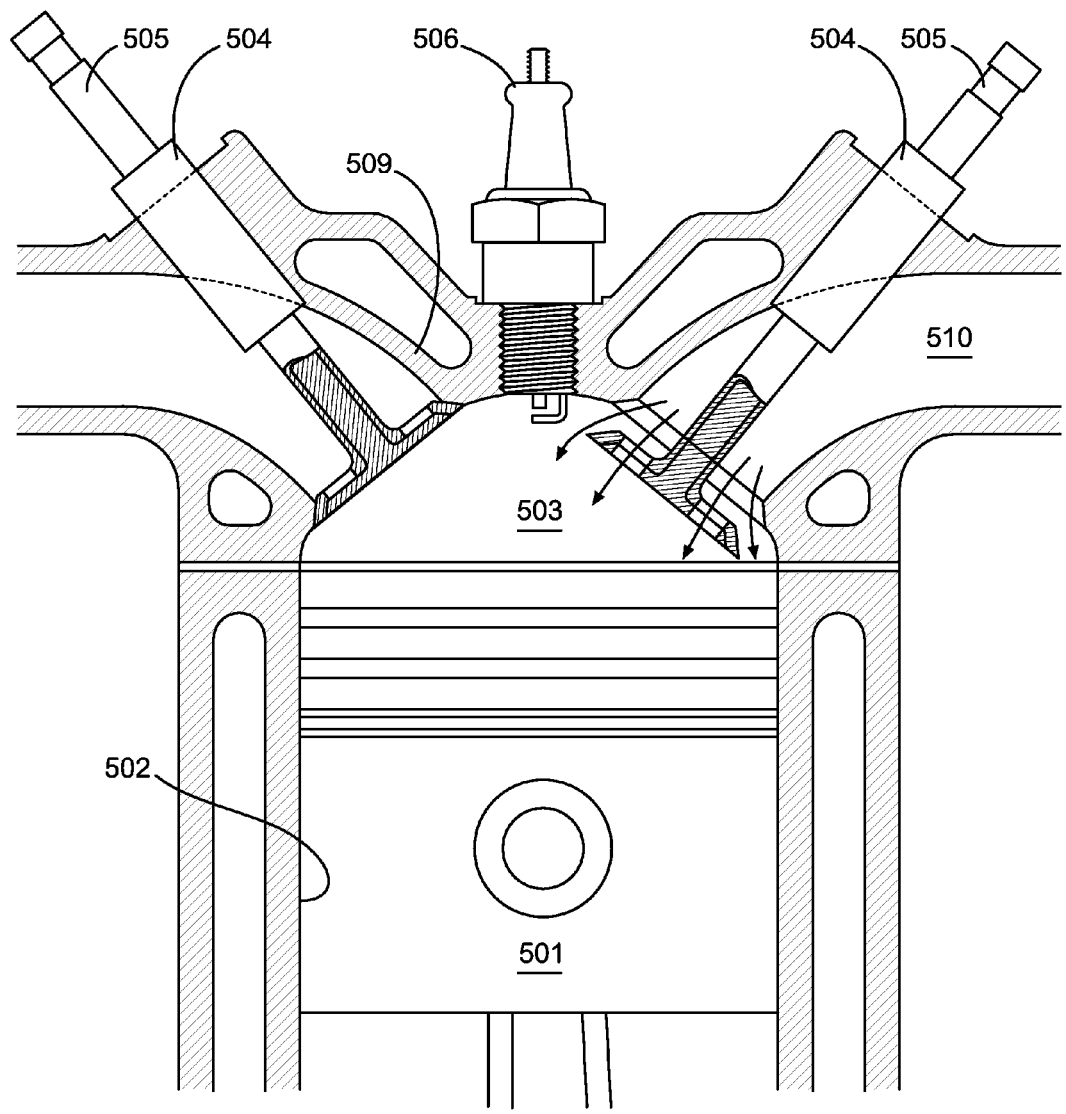
FIG. 5 is a cross-sectional view of an internal combustion engine containing one embodiment of the poppet valve of the present invention.

The poppet valve and/or valve guide of each embodiment of the present invention can be used in an internal combustion engine as depicted in FIG. 5, including the embodiments discussed with regard to FIGS. 1A, 1B, 2, 3A, 3B, 4A, 4B, and 6. For illustrative and discussion purposes only, the poppet valve as embodied in FIG. 1A is used in the embodiment of FIG. 5. As known to one of skill in the art, an internal combustion engine includes a reciprocating piston 501 which moves linearly within a cylinder 502. The internal combustion engine includes a combustion chamber 503, which is the volume between the top of the piston 501 and the cylinder head 509. A spark plug 506 may be used as an ignition source. In the embodiment of FIG. 5, air is traveling down the intake port 510 and into the combustion chamber 503. The poppet valve is in the open position, such that the air is entering the combustion chamber 503 by flowing both around the outer valve head 106 and through the outer valve ports 103 and the inner valve ports 105. One of skill in the art will understand that the internal combustion engine of embodiments of the present invention can be of numerous types, including gasoline, diesel, two-stroke, four-stroke, carbureted, fuel injected, direct fuel injected, and the like. Similarly, the internal combustion engine of embodiments of the present invention may be naturally aspirated or may use a forced induction system, including superchargers and turbo chargers as known to those skilled in the art. Also, one of skill in the art will understand that any means can be used to cause the inner valve to rotate relative to the outer valve, such as mechanical, hydraulic, and electric means.

Figure 6:
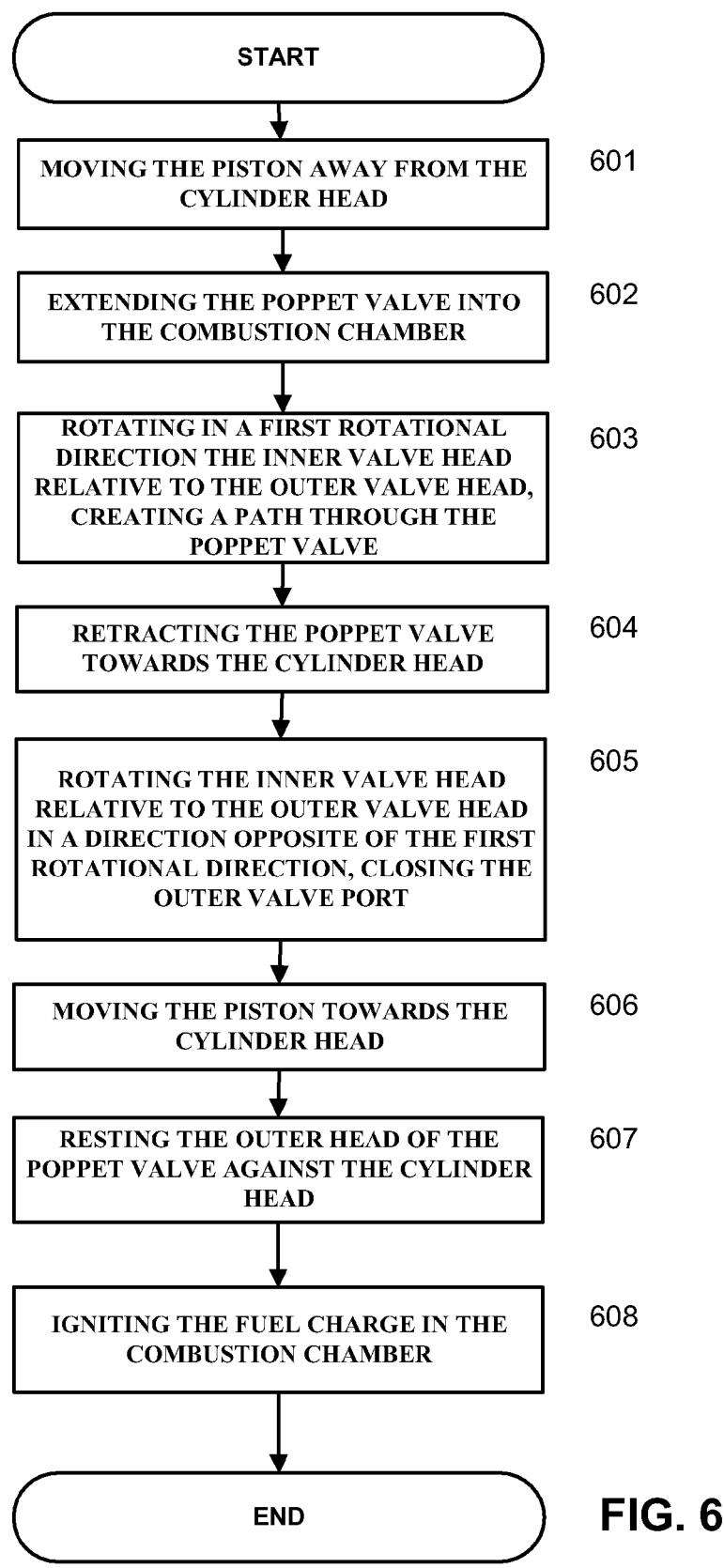
FIG. 6 illustrates a method of one embodiment of the present invention for operating a poppet valve in an internal combustion engine.

One embodiment of the present invention for operating an intake poppet valve in an internal combustion engine is provided in FIG. 6. The internal combustion engine can be the internal combustion engine depicted in FIG. 5, but any type of internal combustion engine can be used. The method of FIG. 6 can also be used in non-engine applications as well. In the embodiment of FIG. 6, the internal combustion engine comprises a cylinder head including a poppet valve, a combustion chamber, and a piston. The poppet valve of the present embodiment comprises an outer valve head and an inner valve head. The outer valve head comprises an outer valve port and an inner valve head comprising an inner valve port. The inner valve rotates relative to the outer valve to align the outer valve port with the inner valve port, creating a path through which air can flow. Any of the poppet valve and valve guide embodiments of the present invention may be used with the embodiment of FIG. 6, including the embodiments shown in FIGS. 1A, 1B, 2, 3A, 3B, 4A, 4B, and 5.

First in the embodiment of FIG. 6, the piston moves 601 away from the cylinder head, increasing the volume in the combustion chamber. Second, the poppet valve extends 602 into the combustion chamber, enabling a fuel charge to flow past the outer valve head and into the combustion chamber. Next in the present embodiment, the inner valve head rotates 603 in a first rotational direction relative to the outer valve head, causing the outer valve port to align with the inner valve port, creating a path through which air can flow into the combustion chamber. As understood by one of skill in the art, steps 601, 602, and 603 may be performed in any order depending on the particular valve timing of the internal combustion engine.

Fourth in the present embodiment, the poppet valve is retracted 604 toward the cylinder head. The inner valve head is then rotated 605 relative to the outer valve head in a direction opposite of the first rotational direction, causing the outer valve port to close. Sixth, the piston moves 606 toward the cylinder head, decreasing the volume in the combustion chamber. Seventh, the outer head of the poppet valve rests 607 against the cylinder head, closing the combustion chamber. Finally, the fuel charge is ignited 608 in the combustion chamber. The inner valve head may be rotated relative to the outer valve head using at least one of mechanical, hydraulic, or electronic means as known to those skilled in the art. Steps 604, 605, and 606 may be performed in any order depending on the particular valve timing of the internal combustion engine, as understood by one of skill in the art.

In one embodiment extending the embodiment of FIG. 6, the poppet valve comprises an outer valve stem connected to the outer valve head, and an inner valve stem connected to an inner valve head, wherein a guide pin is located on the outer valve stem. In a further embodiment extending the embodiment of FIG. 6, the poppet valve further comprises a guide pin located on the inner valve stem and a timing window located on the outer valve stem, the guide pin located within the timing window to define the maximum rotation of the inner valve head relative to the outer valve head. Additionally, the poppet valve may be contained within a valve guide in the cylinder head, the valve guide comprising a timing groove on the inner surface of the valve guide and in contact with the guide pin, wherein the timing groove exerts a horizontal force on the guide pin as the poppet valve moves longitudinally relative to the valve guide, enabling the outer valve ports to selectively open and close. Further extending the present embodiment, the valve guide may include a longitudinal groove and the outer valve may include a longitudinal ridge in contact with the groove, wherein the groove and ridge prevent the outer valve from freely rotating relative to the valve guide.

In a further embodiment extending the embodiment of FIG. 6, the outer valve port and the inner valve port are designed to improve mixing of the fuel charge in the combustion chamber. One of skill in the art will understand that either one or both of the inner valve ports and the outer valve ports can be designed to improve mixing in the combustion chamber. In one embodiment, the outer valve port and the inner valve port are arranged to create a swirling action in the combustion chamber when air passes through the poppet valve. One of skill in the art will understand that every outer and inner valve port arrangement discussed with respect to embodiments of the present invention may be used with the embodiment of FIG. 6. Finally, the methods of FIG. 6 can be embedded in computer program products executable by a digital device, wherein digital devices include personal computers, laptops, personal digital assistants, digital processors embedded in automobiles, and the like.

While the invention has been described in detail in connection with specific embodiments, it should be understood that the invention is not limited to the above-disclosed embodiments. Rather, the invention can be modified to incorporate any number of variations, alternations, substitutions, or equivalent arrangements not heretofore described, but which are commensurate with the spirit and scope of the invention. Specific embodiments should be taken as exemplary and not limiting.

I claim:

1. A poppet valve comprising:
   a. an outer valve head comprising at least a first outer valve port;
   b. an outer valve stem coupled to the outer valve head;
   c. an inner valve head carried rotationally against the outer valve head, the inner valve head comprising at least a first inner valve port, wherein the inner valve head and the outer valve head are rotatable relative to each other to create a first path through the poppet valve when the first inner valve port is aligned with the first outer valve port, and wherein the poppet valve controls the flow of a fluid into an area; and d. an inner valve stem coupled to the inner valve head.

2. The poppet valve of claim 1, wherein the area comprises a combustion chamber of an internal combustion engine.

3. The poppet valve of claim 1, wherein the first inner valve port comprises an open two-dimensional area.

4. The poppet valve of claim 1, wherein the first path directs at least a portion of the fluid flowing into the area into a mixing action.

5. The poppet valve of claim 4, wherein at least a part of the first path is curved.

6. The poppet valve of claim 4, wherein at least a part of the first path is not parallel to the outer valve stem.

7. The poppet valve of claim 4, wherein the area comprises a combustion chamber of an internal combustion engine.

8. The poppet valve of claim 4, wherein the mixing action comprises a swirling motion.

9. The poppet valve of claim 8, wherein at least a part of the first path is curved.

10. The poppet valve of claim 8, wherein at least a part of the first path is not parallel to the outer valve stem.

11. The poppet valve of claim 8, wherein the area comprises a combustion chamber of an internal combustion engine.

12. The poppet valve of claim 11, wherein at least a part of the first path is curved.

13. The poppet valve of claim 8, wherein the first inner valve port comprises an open two-dimensional area.

14. The poppet valve of claim 1, wherein the first inner valve port directs at least a portion of the fluid flowing into the area into a mixing action.

15. The poppet valve of claim 14, wherein the first inner valve port comprises an open two-dimensional area.

16. The poppet valve of claim 14, wherein the area comprises a combustion chamber of an internal combustion engine.

17. The poppet valve of claim 14, wherein the mixing action comprises a swirling motion.

18. The poppet valve of claim 17, wherein the area comprises a combustion chamber of an internal combustion engine.

19. The poppet valve of claim 17, wherein the first inner valve port comprises an open two-dimensional area.

20. The poppet valve of claim 1, wherein the first outer valve port directs at least a portion of the fluid flowing into the area into a mixing action.

21. The poppet valve of claim 20, wherein the first inner valve port comprises an open two-dimensional area.

22. The poppet valve of claim 20, wherein the area comprises a combustion chamber of an internal combustion engine.

23. The poppet valve of claim 20, wherein the mixing action comprises a swirling motion.

24. The poppet valve of claim 23, wherein the first inner valve port comprises an open two-dimensional area.

25. A poppet valve comprising:
   a. an outer valve head comprising a means for allowing a fluid to pass through the outer valve head;
   b. an outer valve stem coupled to the outer valve head;
   c. an inner valve head carried rotationally against the outer valve head, the inner valve head comprising a means for allowing the fluid to pass through the inner valve head, wherein the inner valve head and the outer valve head are rotatable relative to each other to create a first path through the poppet valve when the means for allowing the fluid to pass through the outer valve head is aligned with the means for allowing the fluid to pass through the inner valve head; and
   d. an inner valve stem coupled to the inner valve head.

26. The poppet valve of claim 25, wherein the poppet valve controls flow of the fluid into a combustion chamber of an internal combustion engine.

27. The poppet valve of claim 25, wherein the poppet valve controls flow of the fluid into an area, and wherein the first path directs at least a portion of the fluid flowing into the area into a mixing action.

28. The poppet valve of claim 27, wherein at least a part of the first path is curved.

29. The poppet valve of claim 27, wherein at least a part of the first path is not parallel to the outer valve stem.

30. The poppet valve of claim 27, wherein the mixing action comprises a swirling motion.

31. The poppet valve of claim 30, wherein at least a part of the first path is curved.

32. The poppet valve of claim 30, wherein at least a part of the first path is not parallel to the outer valve stem.

33. The poppet valve of claim 30, wherein the area comprises a combustion chamber of an internal combustion engine.

34. The poppet valve of claim 25, wherein the means for allowing the fluid to pass through the outer valve head directs at least a portion of the fluid exiting the first path into a mixing action.

35. The poppet valve of claim 34, wherein the mixing action comprises a swirling motion.

36. The poppet valve of claim 25, wherein the means for allowing the fluid to pass through the inner valve head directs at least a portion of the fluid exiting the first path into a mixing action.

37. The poppet valve of claim 36, wherein the mixing action comprises a swirling motion.

38. A poppet valve comprising:
   a. an outer valve head comprising at least a first outer valve port and a second outer valve port;
   b. an outer valve stem coupled to the outer valve head;
   c. an inner valve head carried rotationally against the outer valve head, the inner valve head comprising at least a first inner valve port and a second inner valve port, wherein the inner valve head and the outer valve head are rotatable relative to each other to create a first path and a second path through the poppet valve when the first and second inner valve ports are aligned with the first and second outer valve ports; and
   d. an inner valve stem coupled to the inner valve head.

39. The poppet valve of claim 38, wherein the poppet valve is incorporated into an internal combustion engine.

40. The poppet valve of claim 38, wherein at least one of the first inner valve port or the second inner valve port comprises an open two-dimensional area.

41. The poppet valve of claim 38, wherein at least one of the first path or the second path directs at least a portion of a fluid flowing into an area into a mixing action.

42. The poppet valve of claim 41, wherein at least a part of the first path or the second path is curved.

43. The poppet valve of claim 41, wherein at least a part of the first path or the second path is not parallel to the outer valve stem.

44. The poppet valve of claim 41, wherein the mixing action comprises a swirling motion.

45. The poppet valve of claim 44, wherein at least a part of the first path or the second path is curved.

46. The poppet valve of claim 44, wherein at least a part of the first path or the second path is not parallel to the outer valve stem.

47. The poppet valve of claim 38, wherein at least one of the first outer valve port or the second outer valve port directs at least a portion of a fluid exiting the first and second paths into a mixing action.

48. The poppet valve of claim 47, wherein the mixing action comprises a swirling motion.

49. The poppet valve of claim 38, wherein at least one of the first inner valve port or the second inner valve port directs at least a portion of a fluid exiting the first and second paths into a mixing action.

50. The poppet valve of claim 49, wherein the mixing action comprises a swirling motion.

* * * * *